(12) United States Patent
Schell et al.

(10) Patent No.: US 11,108,460 B2
(45) Date of Patent: Aug. 31, 2021

(54) SYSTEM AND METHODS TO RECLAIM UNUSED THROUGHPUT IN AN SDARS SYSTEM

(71) Applicant: Sirius XM Radio, Inc., New York, NY (US)

(72) Inventors: Edward Schell, Jackson, NJ (US); Carl Scarpa, Plainsboro, NJ (US); John Goslin, Burlington, NJ (US)

(73) Assignee: Sirius XM Radio Inc., New York, NY (US)

( * ) Notice: Subject to any disclaimer, the term of this patent is extended or adjusted under 35 U.S.C. 154(b) by 0 days.

(21) Appl. No.: 16/168,285

(22) Filed: Oct. 23, 2018

(65) Prior Publication Data
US 2019/0123807 A1    Apr. 25, 2019

Related U.S. Application Data

(62) Division of application No. 14/845,080, filed on Sep. 3, 2015, now Pat. No. 10,110,296.
(Continued)

(51) Int. Cl.
| | |
|---|---|
| *H04B 7/185* | (2006.01) |
| *H04L 27/34* | (2006.01) |
| *H04L 1/00* | (2006.01) |

(52) U.S. Cl.
CPC ......... *H04B 7/185* (2013.01); *H04L 27/3488* (2013.01); *H04L 1/004* (2013.01)

(58) Field of Classification Search
CPC ...... H04B 7/185; H04L 1/004; H04L 27/3488
See application file for complete search history.

(56) References Cited

U.S. PATENT DOCUMENTS

| | | | | |
|---|---|---|---|---|
| 2005/0111579 A1* | 5/2005 | Walker | ............... | H04L 27/3466 375/308 |
| 2009/0168809 A1* | 7/2009 | Scarpa | .................. | H04L 27/183 370/503 |
| 2010/0086087 A1 | 4/2010 | Pekonen et al. | | |
| 2010/0175096 A1 | 7/2010 | Seo et al. | | |

(Continued)

FOREIGN PATENT DOCUMENTS

| | | |
|---|---|---|
| EP | 0689308 B1 | 10/2001 |
| WO | WO2003/039011 A1 | 5/2003 |

(Continued)

OTHER PUBLICATIONS

International Search Report International Application No. PCT/US2015/048401, Filing Date, Sep. 3, 2015, dated Dec. 29, 2015.

*Primary Examiner* — Stephen J Clawson
(74) *Attorney, Agent, or Firm* — Kramer Levin Naftalis & Frankel LLP

(57) ABSTRACT

Systems, algorithms and methods for reclaiming unused portions of a satellite broadcast service's bandwidth for new services, utilizing higher performance coding techniques to yield better throughput, are presented. These systems, algorithms and methods achieve the reclaimed bandwidth in a way that is invisible to a legacy receiver, and that does not interfere with its reception of a legacy signal. In one embodiment, new data may be transmitted within a legacy transmission frame, for example within its cluster structure, using the same modulation and synchronization as used for the legacy data. The new data may be inserted into a channel or other subdivision at a head end. In another embodiment, one or more clusters or subdivisions with only new data may be transmitted, using the same modulation and synchronization as the legacy data clusters, but now employing a higher performing FEC and data interleaving structure on those clusters which contain only new data to yield an increase in available throughput. Finally, in a third embodiment, one or more clusters containing only new data may be (Continued)

transmitted, and in said one or more all new data clusters, different modulation and synchronization may be used then that of the legacy data clusters, thus employing a higher performing FEC and data interleaving structure than that of the legacy clusters. Various combinations of these approaches are also presented, as well as a set of novel receivers, or receiver configurations, to implement them and their combinations.

18 Claims, 4 Drawing Sheets

Related U.S. Application Data

(60) Provisional application No. 62/045,385, filed on Sep. 3, 2014.

(56) References Cited

U.S. PATENT DOCUMENTS

| 2012/0219087 A1 | 8/2012 | Lim et al. |
| 2014/0153625 A1 | 6/2014 | Vojcic et al. |

FOREIGN PATENT DOCUMENTS

| WO | WO2009/061602 A1 | 5/2009 |
| WO | WO2012/148860 A1 | 11/2012 |

* cited by examiner

SYSTEM AND METHODS TO RECLAIM UNUSED THROUGHPUT IN AN SDARS SYSTEM

CROSS-REFERENCE TO RELATED APPLICATIONS

This application is a divisional of U.S. application Ser. No. 14/845,080, filed Sep. 3, 2015, which issued on Oct. 23, 2018 as U.S. Pat. No. 10,110,296, which claims the benefit of U.S. Provisional Application 62/045,385, entitled "METHODS TO RECLIAM UNUSED THROUGHOUT IN AN SDARS SYSTEM," filed on Sep. 3, 2014, the contents of each of these applications are hereby incorporated by reference herein in their entirety.

TECHNICAL FIELD

This invention relates to digital satellite radio transmission, and in particular to methods of leveraging extra bandwidth in legacy transmission schemes to send content and/or data modulated and framed using newer techniques.

BACKGROUND OF THE INVENTION

The present invention seeks to improve the efficiency of bandwidth usage in Satellite Digital Audio Radio Services ("SDARS"), such as those provided by Sirius XM Radio, Inc. ("SXM"). It is thus noted that during the initial design phase of legacy SDARS systems, Concatenated Reed-Solomon Convolutional Codes were considered state of the art in Forward Error Correction (FEC) techniques. Since then, great advances have been made on iterative decoding schemes with the introduction of Turbo and LDPC codes, which are now the common practice in all new system designs and standards, such as, for example, 3gpp2, LTE, 802.11, etc. Thus, for example, SXM has taken advantage of these iterative codes by deploying Hierarchical Modulation ("HM") systems on their legacy systems, thereby achieving an increased throughput of at least 25% over the original legacy design. Various SXM HM systems are described in U.S. Pat. Nos. 8,184,743, 9,036,720 and the various patent applications and references described therein, U.S. Pat. No. 8,139,689, and PCT/US2011/000143, now published as WO 2011/094001, the disclosure of each of which is hereby incorporated herein by reference in its entirety. While the addition of HM was a great improvement as regards bandwidth efficiencies, the modulation and FEC coding used (since the beginning) in the legacy systems still present a major roadblock to any further advances in overall bandwidth efficiency. Moreover, any changes made to a legacy system would also need to maintain backwards compatibility with the millions of existing satellite radios in the market.

What is needed in the art are ways to overcome these problems to obtain additional bandwith without sacrificing backwards compatibility of existing receivers.

SUMMARY OF THE INVENTION

Figure 1:
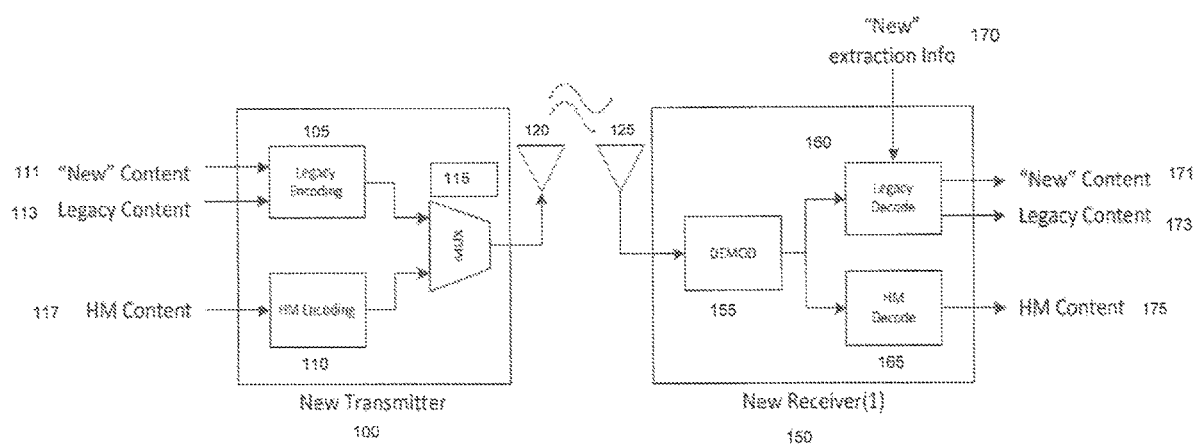
FIG. 1 illustrates insertion, transmission and extraction of new content data into an SDARS broadcast according to an exemplary embodiment of the present invention.

Systems, algorithms and methods for reclaiming unused portions of a satellite broadcast service's bandwidth for new services, utilizing higher performance coding techniques to yield better throughput, are presented. These systems, algorithms and methods achieve the reclaimed bandwidth in a way that is invisible to a legacy receiver, and that does not interfere with its reception of a legacy signal. In one embodiment, new data may be transmitted within a legacy transmission frame, for example within its cluster structure, using the same modulation and synchronization as used for the legacy data. The new data may be inserted into a channel or other subdivision at a head end. In another embodiment, one or more clusters or subdivisions with only new data may be transmitted, using the same modulation and synchronization as the legacy data clusters, but now employing a higher performing FEC and data interleaving structure on those clusters which contain only new data to yield an increase in available throughput. Finally, in a third embodiment, one or more clusters containing only new data may be transmitted, and in said one or more all new data clusters, different modulation and synchronization may be used then that of the legacy data clusters, thus employing a higher performing FEC and data interleaving structure than that of the legacy clusters. Various combinations of these approaches are also presented, as well as a set of novel receivers, or receiver configurations, to implement them and their combinations.

DETAILED DESCRIPTION OF THE INVENTION

In exemplary embodiments of the present invention, unused portions of a legacy SDARS broadcast bandwidth may be reclaimed and used for new content/data services, utilizing higher performance coding techniques to yield better throughput. It is noted that while the systems and methods presented below are illustrated with reference to the lower frequency Sirius SDARS band, this is for purposes of illustration only, and the disclosed methods are understood to not be limited thereto, or for that matter, to any particular system or service. A similar approach may thus also be applied to the upper frequency XM band, or any other satellite radio service or similar context where bandwidth in a legacy system may be reclaimed and used to transmit new content or data using both more efficient (i) modulation techniques, and (ii) error correction coding, than that used in the original legacy system.

The elimination of redundancy in channel content, as well as improvements in audio compression have been able to free up portions of available throughput in legacy systems, such as, for example, the SiriusXM SDARS "low band" (this is the "Sirius" branded service). In the case of this band, since current radios/receivers in production will still be receiving the same comparable content as before (i.e., the "legacy signal"), there is no need to make the newly liberated ("New") bandwidth available to legacy radios. They currently receive all that they can. This state of affairs also provides freedom on how the new throughput may be utilized, for content that a legacy radio may not be capable of processing. Thus, a goal or motivation of various exemplary embodiments of the present invention is the ability to siphon off unused legacy throughput (achieved due to such eliminations of redundancy and improved audio compression) for new content and services that are only made available to future radios, thus allowing an SDARS provide to better monetize the streams and obtain greater bandwidth efficiency from its spectrum.

In exemplary embodiments of the present invention, siphoning off "New" bandwidth can be accomplished in multiple ways. These are next described, with reference to three options Option 1: Insertion of New Content into Existing Clusters A first exemplary method is to utilize an entire legacy delivery system. In this case, the "New" content can be inserted into the Legacy baseband layer at the Head End system, where current content is inserted. The content may be, for example, divided and segmented into physical channels of varying size or other useful divisions. The new content can, for example, occupy one or more physical channels. However, no information about the "New" content need be provided via the legacy channel mapping (as legacy receivers cannot decode it), thus leaving legacy radios unaware of the new content. The "New" content can go through the same physical layer synchronization and FEC processing as the legacy path does. Moreover, at the receiver, only new radio platforms with knowledge of the "New" content will be able to provide the necessary extraction information to receive the New data. This contemplates more modern, and more advanced, receivers being made available to the public that can decode the new content inserted in the broadcast given the techniques of the present invention, but said new content having no effect—and not being "seen"—by older receivers, i.e. those designed to simply receive the legacy transmission. Thus, the extraction information may be directed only towards such capable receivers through various messaging schemes. In some embodiments, the measured benefit of this approach will generally be limited by the amount of throughput made available through added efficiencies of the existing legacy content, as described above.

FIG. 1 is a simplified drawing showing the insertion and extraction of "New" content in exemplary embodiments of the present invention according to this first option. With reference thereto, at the transmitter side, a New Transmitter 100 is shown, where New Content 111 is input to a Legacy Encoding Module 105, together with standard Legacy Content 113. The New Transmitter 100 also has a HM Encoding Module 110, whose operation and inputs remain unchanged by any of the New data in this example. On the receiver side, a New Receiver(1) 150 is shown. There is a single DEMOD 155 signal path, because, in this example, the legacy demodulation scheme has not changed, and the new data may simply be sent within that existing modulation scheme inserted in one or more clusters. However, the Legacy Decode Module 160 now outputs two datastreams. A New Content 171 datastream, coming from the New data 111 inserted into one (or more than one) of the legacy clusters, and a regular Legacy Content 173 datastream, as in the standard legacy transmission. To correctly extract the "New" Content 171, "New" Extraction Information 170 may be accessed by the Legacy Decode Module 160, which should be sent to the receiver, for example, in the same fashion as the channel mapping.

As an illustrative example, the throughput of the Sirius broadcast legacy system, for example, is evenly divided into five individual groupings, called clusters. Each cluster is associated with data for a number of channels, e.g. 20. Each of these clusters is independent of the others and is transmitted in a time-sliced, e.g., Time Division Multiplexing, approach. Each cluster is itself divided into 255 subsections. These subsections are interleaved with those of the remaining clusters, as shown in FIG. 2.

Figure 2:
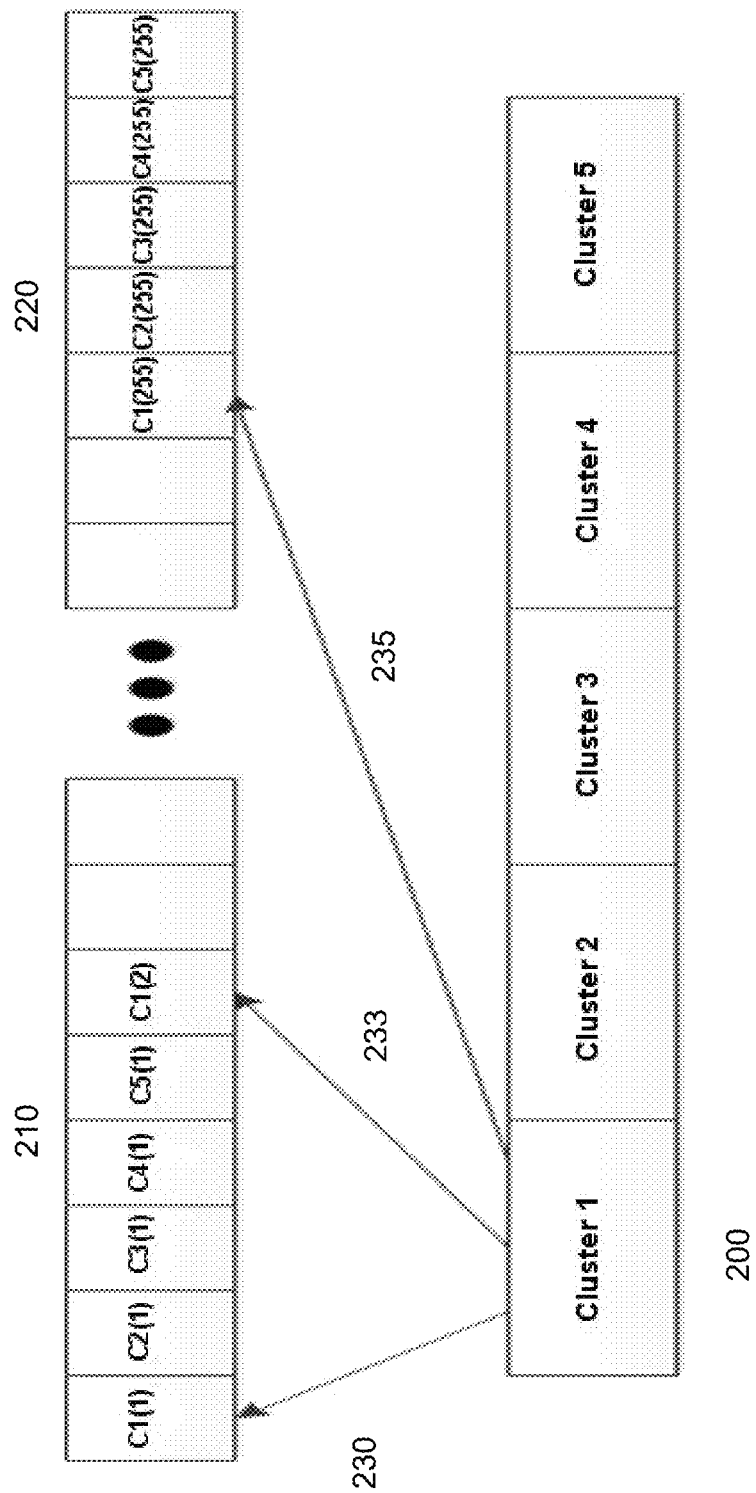
FIG. 2 illustrates an exemplary cluster structure as used in the Sirius Satellite Radio legacy system.

So, as shown in FIG. 2, taking, for example, Cluster 1 200, its 255 subsections are interleaved with the 255 subsections of Clusters 2, 3, 4 and 5 to generate a transmission frame. This structure is described in detail in U.S. Pat. No. 6,618,367 which is fully incorporated by reference herein. So, at a beginning portion 210 of a transmission frame, a first subsection of Cluster 1, C1(1), is placed at the beginning of the transmission frame, as shown by arrow 230. It is noted that in U.S. Pat. No. 6,618,367, the subsections spoken of here are referred to as "Segments", but can be any subdivision or division of a transmission frame Similarly, following arrow 233, the second subsection of Cluster 1, C1(2), is placed in the transmission frame after the remaining first subsections of each of Clusters 2-5, namely C2(1), C3(1), C4(1) and C5(1), have been placed. This process continues, where all subsections N for a Cluster M are interleaved with the corresponding subsections CN(M) of all clusters M, until the last subsection, subsection 255 of Cluster 1, i.e. C1(255) in FIG. 2, is placed, as shown by arrow 235, and is then followed by subsections C2(255), C3(255), C4(255) and C5(255) as shown at 220.

Thus, if the liberated throughput from the legacy transmission is greater than or equal to the size of one cluster or subdivision, an opportunity arises to improve on the overall bandwidth efficiency by claiming one or more entire clusters to be used in a new coding scheme. This is next described.

Option 2: Full Cluster Reclamation using Legacy Synchronization and Modulation

A second option thus involves reclaiming an entire cluster for "New" content and services. This approach is to utilize the same legacy synchronization and modulation, but now employ a higher performing FEC and data interleaving structure to yield an increase in available throughput. In this case, an entire cluster, or multiple entire clusters, can be replaced with the newly encoded content. As with the existing legacy scheme, the "New" cluster will be similarly segmented and interleaved with the remaining clusters using the same scheme as the legacy transmission. Such as, for example, the scheme illustrated in U.S. Pat. No. 6,618,367, as noted. Since there are no changes to the legacy synchronization and modulation, there will be no impact on legacy radios. Any use of HM will also be unaffected, as the New data will only be placed on the legacy QPSK symbol mapping, leaving the mapping of the HM intact. The choice of Forward Error Correction ("FEC") for the New Content clusters can be, but is not limited to, Turbo or LDPC codes, for example. The interleaver structure for said New clusters can be, for example, a programmable convolutional interleaver, which is capable of much greater delay spreads over the fixed duration of the legacy system. As more than one entire cluster is freed up, multiple instantiations of this technique can be used to reclaim additional clusters until finally all five clusters have been reclaimed and used for New content.

It is noted that this "reclamation of entire cluster" approach may also be used in conjunction with the previously mentioned approach of FIG. 1, where only a portion of a cluster is reclaimed using the existing legacy coding scheme. Such a combination provides interim increases in throughput, until full clusters become available, at which time another instance of Option 2 would be implemented. In addition to the partial cluster throughput, for the SXM Sirius band case, new FEC coding is generally expected to provide as much as a 25% increase over the current legacy cluster throughput, resulting in, for example, an additional 200 Kbps per cluster.

Figure 3:
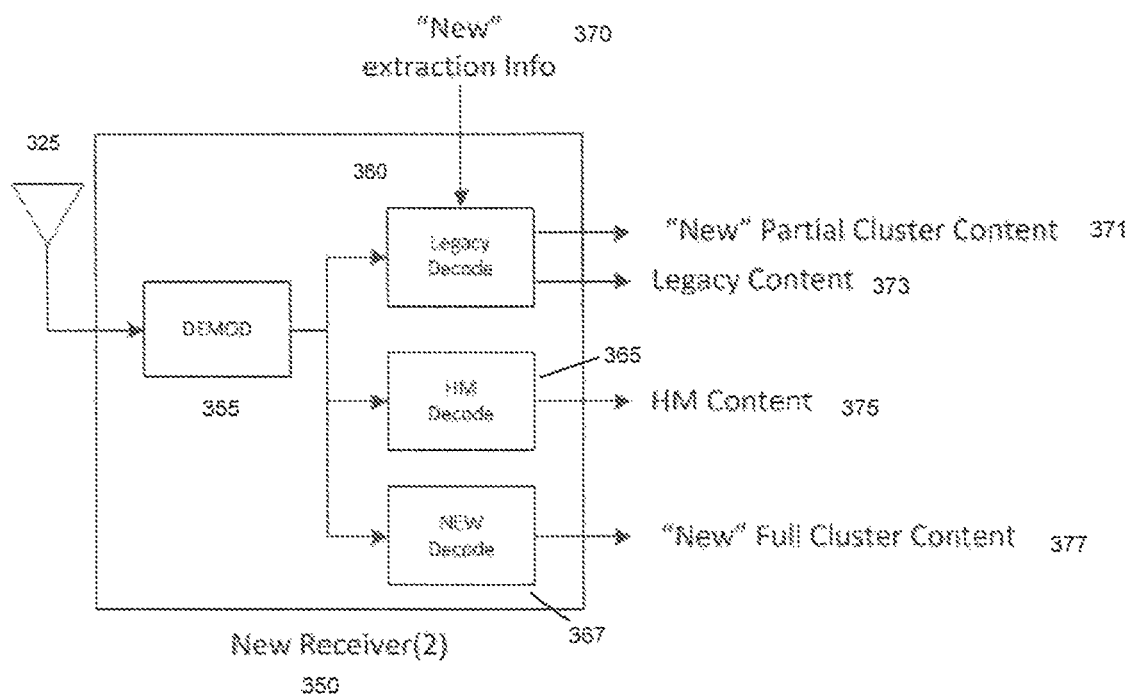
FIG. 3 illustrates an exemplary novel receiver to be used in connection with an alternate exemplary embodiment of the present invention.

FIG. 3 illustrates a simplified drawing of an exemplary "New" receiver called "New Receiver (2)" 350 which may be used in a combination of a "partial cluster" reclamation of throughput as per Option 1 with a "full cluster" reclamation of throughput as per Option 2. With reference thereto, signal enters at antenna 325 and from there is a single DEMOD 355 signal path, because the legacy demodulation scheme has not changed. However, a full "New" cluster is decoded at the NEW Decode module 367, the HM data 375 is decoded at HM Decode 365, as in a standard legacy receiver, and the Legacy Decode module 360 outputs two datastreams, just as in the case of FIG. 1. These include a New Partial Cluster Content 371 datastream, coming from the New data inserted into one of the legacy clusters as per Option 1, and a regular Legacy Content 373, as in the standard legacy transmission. To correctly extract the "New" Partial Cluster Content 371, "New" extraction information 370 is accessed by the Legacy Decode module 360, as was also the case in FIG. 1. Here, the novel aspect is that New Full Cluster Content 377 is extracted by New Decode module 367.

Option 3: Full Cluster Reclamation and Remodulation

In exemplary embodiments of the present invention, a third option also involves the reclaiming of an entire cluster just as in Option 2. However, in this third exemplary approach, a complete re-modulation of the transmitted symbols for a given cluster is also performed. In this scheme, both the original Legacy and the HM coding can be replaced with a single, more efficient, coding scheme for a New cluster. In exemplary embodiments, a first assumption that may be made is that any HM system will also be clusterized in similar fashion to the legacy path. Therefore, the HM system may be designed in conjunction with this approach, alleviating any need for backwards compatibility. The loss of throughput from removing a cluster of HM data can be accounted for in the "New" integrated (Legacy and HM) cluster. Thus in this option, full access to the symbols during the cluster period is provided, allowing it to deploy any sort of modulation, synchronization, and FEC most appropriate. For example, synchronization symbols may be common, but not limited to, the legacy synchronization patterns to minimize impact to the legacy service. The modulation may include a combination of, but again, is not limited to, QPSK, 8PSK, 16QAM, C16QAM or other multi-symbol scheme. Any data dispersion (i.e. interleaver, mixer, etc.) may be unique to the new system. Also, for example, the FEC may be, but is not limited to, Turbo or LDPC codes. The main advantage to the exemplary approach of this third option is the added efficiency gained by combining the coding of the older Legacy and HM datastreams into a single New scheme as for each New cluster. As with the previous example (i.e., the second approach, as shown in FIG. 3), this third optional approach can also have multiple instantiations as multiple clusters become available (i.e. multiple full clusters remodulated), and may additionally have the added interim throughput of a partial cluster, as described in the first exemplary approach, as shown in FIG. 1. In addition to the partial cluster throughput, the new modulation and FEC coding of Option 3 is expected to provide as much as a 45% increase over the combined Legacy/HM Cluster throughput, resulting in, for example, an additional 500 Kbps of throughput per cluster.

Figure 4:
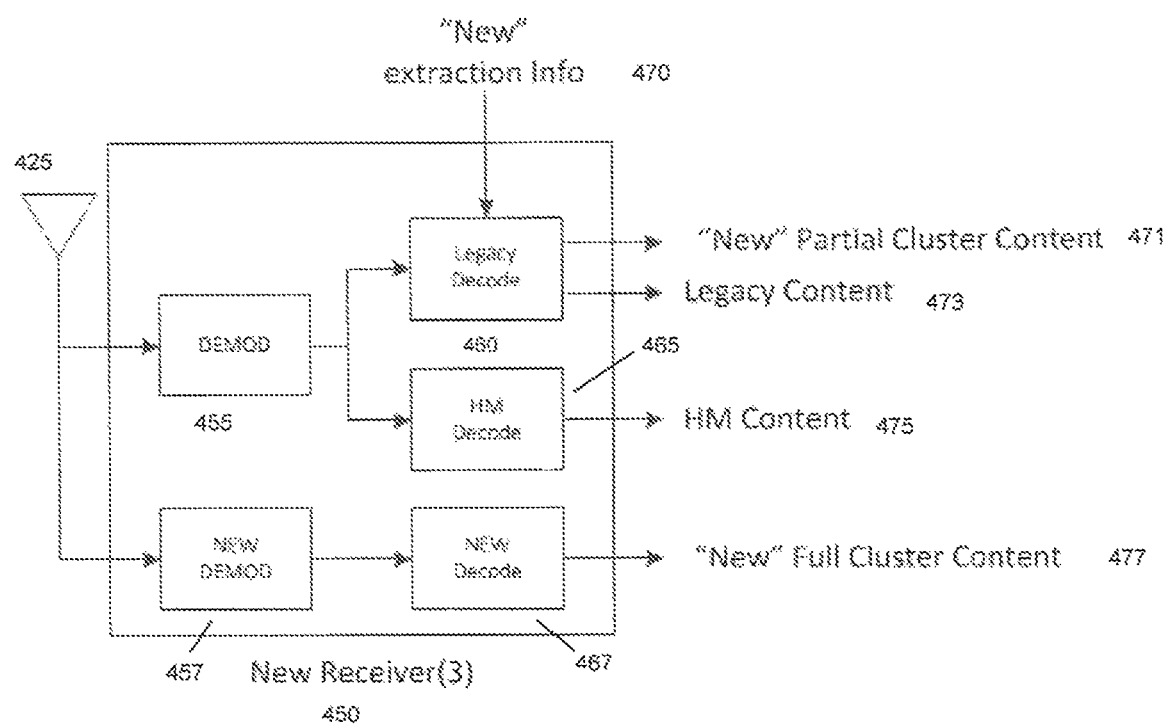
FIG. 4 illustrates a novel modulation approach with both a legacy demodulator and a new signal demodulator, where the legacy demodulator operates on both legacy content as well as new partial cluster content, according to an exemplary embodiment of the present invention.

FIG. 4 illustrates a simplified drawing of the new modulation approach of this exemplary third approach, in a new hybrid receiver shown as "New Receiver (3)" 450. With reference thereto, downstream of antenna 425, the novel receiver 450 has both a legacy DEMOD signal path 455 and a NEW DEMOD signal path 457, and the input signal coming off the air and through antenna 425 is fed to each of them. The NEW DEMOD signal path 457 has, as noted, a different modulation scheme than the legacy data clusters. Thus, full "New" clusters 477 are decoded at the NEW DEMOD module 457 of the receiver, and "New" Full Cluster Content 477 is obtained. Additionally, at the legacy DEMOD signal path 455, both Legacy Content 473 and HM Content 475 are extracted as these clusters were modulated under the old legacy format. In the depicted example, there is also New content that is sent within one of the legacy clusters (but where that whole cluster is not dedicated to New Content) as per Option 1, above, and thus the output of Legacy Decode 460 is both (i) "New" Partial Cluster Content 471 as well as (ii) Legacy Content 473. To correctly extract the "New" Partial Cluster Content 471 from those combined clusters as per Option 1, as above, "New" extraction information 470 may be accessed by the Legacy Decode module 460, as was the case in FIGS. 1 and 3 (Index Nos. 170 and 370, respectively).

Thus, the proposed systems and methods described herein provide a clear approach to achieving better spectral efficiency, while maintaining backwards compatibility with a legacy transmission structure. As the complexity of each option increases, so does the added benefit of additional throughput.

Non-Limiting Software and Hardware Examples

Various exemplary embodiments of the invention as described above can be implemented as one or more program products, software applications and the like, for use with a computer system, both as to transmission from preparation and as to receiver operations and processes. The terms program, software application, and the like, as used herein, are defined as a sequence of instructions designed for execution on a computer system or data processor. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The program(s) of the program product or software may define functions of the embodiments (including the methods described herein) and can be contained on a variety of computer readable media. Illustrative computer readable media include, but are not limited to: (i) information permanently stored on non-writable storage medium (e.g., read-only memory devices within a computer such as CD-ROM disk readable by a CD-ROM drive); (ii) alterable information stored on writable storage medium (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such computer readable media, when carrying computer-readable instructions that direct the functions of the present invention, represent embodiments of the present invention.

In general, the routines executed to implement the embodiments of the present invention, whether implemented as part of an operating system or a specific application, component, program, module, object or sequence of instructions may be referred to herein as a "program." A computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It is also clear that given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.) It should be appreciated that the invention is not limited to the specific organization and allocation or program functionality described herein.

The present invention may be realized in hardware, software, or a combination of hardware and software. A system according to a preferred embodiment of the present invention can be realized in a centralized fashion in one computer system on the transmit side, and one receiver on the receive side, or in a distributed fashion where different elements are spread across several interconnected computer systems, including cloud connected computing systems and devices. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

Each computer system may include, inter alia, one or more computers and at least a signal bearing medium allowing a computer to read data, instructions, messages or message packets, and other signal bearing information from the signal bearing medium. The signal bearing medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the signal bearing medium may comprise signal bearing information in a transitory state medium such as a network link and/or a network interface, including a wired network or a wireless network, that allow a computer to read such signal bearing information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. The above-presented description and figures are intended by way of example only and are not intended to limit the present invention in any way except as set forth in the following claims. For example, while this disclosure speaks in terms of enhancing the bandwidth efficiency of satellite radio broadcasts, its techniques and systems are applicable to any type of communications system, transmitting, broadcasting or exchanging audio, video or other data content. It is particularly noted that persons skilled in the art can readily combine the various technical aspects of the various elements of the various exemplary embodiments that have been described above in numerous other ways, all of which are considered to be within the scope of the invention.

What is claimed is:

1. A method of reclaiming unused legacy bandwidth in a broadcasting system having a broadcast transmission frame with at least two divisions, the method comprising:
    encoding legacy data using a first modulation and synchronization scheme;
    encoding new content data using a second modulation and synchronization scheme different from the first modulation and synchronization scheme;
    transmitting one or more other transmission frame divisions containing the encoded legacy content data; and
    transmitting one or more transmission frame divisions containing only the encoded new content data such that a legacy receiver would not see the divisions containing new data, but receivers configured to decode the new content data would;
    wherein the one or more transmission frame divisions containing solely new content data are processed using a higher performing FEC and data interleaving structure than that of the other divisions that contain any legacy content data.

2. The method of claim 1, further comprising, in addition to the divisions containing solely new content data, transmitting additional new data within at least one of the other transmission frame divisions that contain legacy content data, using the same modulation and synchronization as the legacy data divisions.

3. The method of claim 1, further comprising inserting the encoded new content data into the broadcast transmission frame such that a legacy receiver would not see the divisions containing the new content data, but receivers configured to decode the new content data would.

4. The method of claim 1, wherein the legacy transmission frame data is modulated using both a primary and a secondary layer of modulation, the new content data in said new content data divisions is modulated at the primary layer of modulation, and the secondary layer of modulation operates on both divisions containing legacy content and divisions containing only new content data.

5. The method of claim 1, further comprising sending additional new content data in one or more transmission frame divisions that contain legacy data.

6. The method of claim 1, further comprising sending additional new content data in one or more transmission frame divisions that contain legacy data and sending extraction information relative to any new content data in any combined division having both new content data and legacy data.

7. The method of claim 1, further comprising sending additional new content data in one or more transmission frame divisions that contain legacy data and sending extraction information relative to the new content data through one or more out of band messaging schemes.

8. The method of claim 1, further comprising sending additional new content data in one or more transmission frame divisions that contain legacy data and sending extraction information relative to the new content data within the at least one transmission frame, said extraction information arranged to instruct a receiver how to separate the new content data from other data during decoding.

9. The method of claim 1, wherein divisions containing solely new content data are interleaved with other divisions containing wholly or partially legacy data.

10. The method of claim 1, wherein the transmission frame division is one of a cluster, a cluster segment, a channel, or a physical channel.

11. The method of claim 1, wherein the higher performing FEC includes one of Turbo or Low Density Parity Check codes, and wherein the higher performing data interleaving structure includes at least one of a programmable convolutional interleaver, or an interleaver with significantly greater delay spreads over a fixed duration of the legacy system.

12. A system, comprising:
a transmitter comprising a legacy encoding module, a hierarchical modulation encoding module and a multiplexer; and
a receiver comprising a legacy demodulator, a new data demodulator, a legacy decoding module, a hierarchical modulation decoding module, and a new data decoding module, wherein the transmitter is configured to encode and transmit new content data and legacy content data, the new content data sent in one or more transmission frame divisions containing only new content data, and
wherein the receiver is configured to:
demodulate the legacy content data divisions in the legacy demodulator and send the demodulated data to the legacy decoding module and the hierarchical modulation decoding module,
demodulate the new content data in the new data demodulator, and send the demodulated new data divisions to the new data decoding module;
wherein the only new content containing divisions are modulated differently by the transmitter than the other divisions containing legacy data.

13. The system of claim 12, wherein the only new content containing divisions are modulated using include a combination of QPSK, 8PSK, 16QAM, C16QAM or other multi-symbol scheme.

14. The system of claim 12, wherein the only new content containing divisions are not hierarchically modulated, but integrated as a singly modulated division.

15. The system of claim 12, wherein the transmitter is further configured to also encode and transmit combination divisions containing both new content data and legacy content data.

16. The system of claim 12, wherein the transmitter is further configured to also encode and transmit combination divisions containing both new content data and legacy content data.

17. The system of claim 12, wherein the transmitter is further configured to also encode and transmit combination divisions containing both new content data and legacy content data, and wherein at least one of: the transmitter is further configured to send extraction information relative to any new content data in any combination division, extraction information relative to the new content data is sent through one or more in band or out of band messaging schemes, or the receiver is configured to demodulate the data in said combination divisions and then, at the legacy decoder, separate the new content data from the legacy content data using received extraction information.

18. The system of claim 12, wherein the transmitter is configured to modulate all data in any division with a secondary modulation layer containing hierarchical modulation content.

* * * * *